Dec. 27, 1927.
G. E. WHEELER ET AL
1,654,061
METHOD OF MAKING VEHICLE PROPS
Original Filed Nov. 4, 1926    2 Sheets-Sheet 1
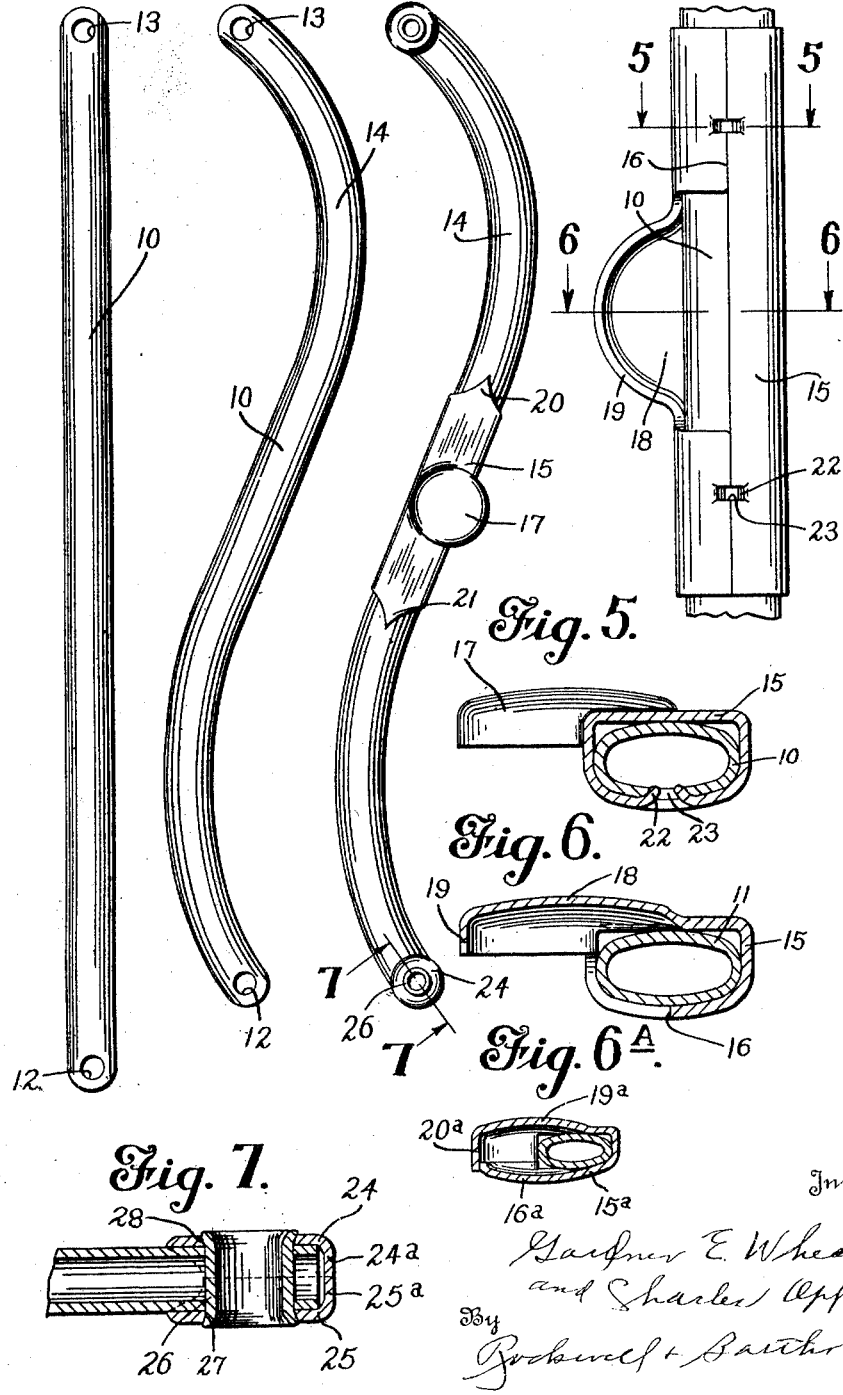
Inventor
Gardner E. Wheeler
and Charles Oppe
By Rockwell & Bartholow
Attorneys Dec. 27, 1927. 1,654,061
G. E. WHEELER ET AL
METHOD OF MAKING VEHICLE PROPS
Original Filed Nov. 4, 1926  2 Sheets-Sheet 2
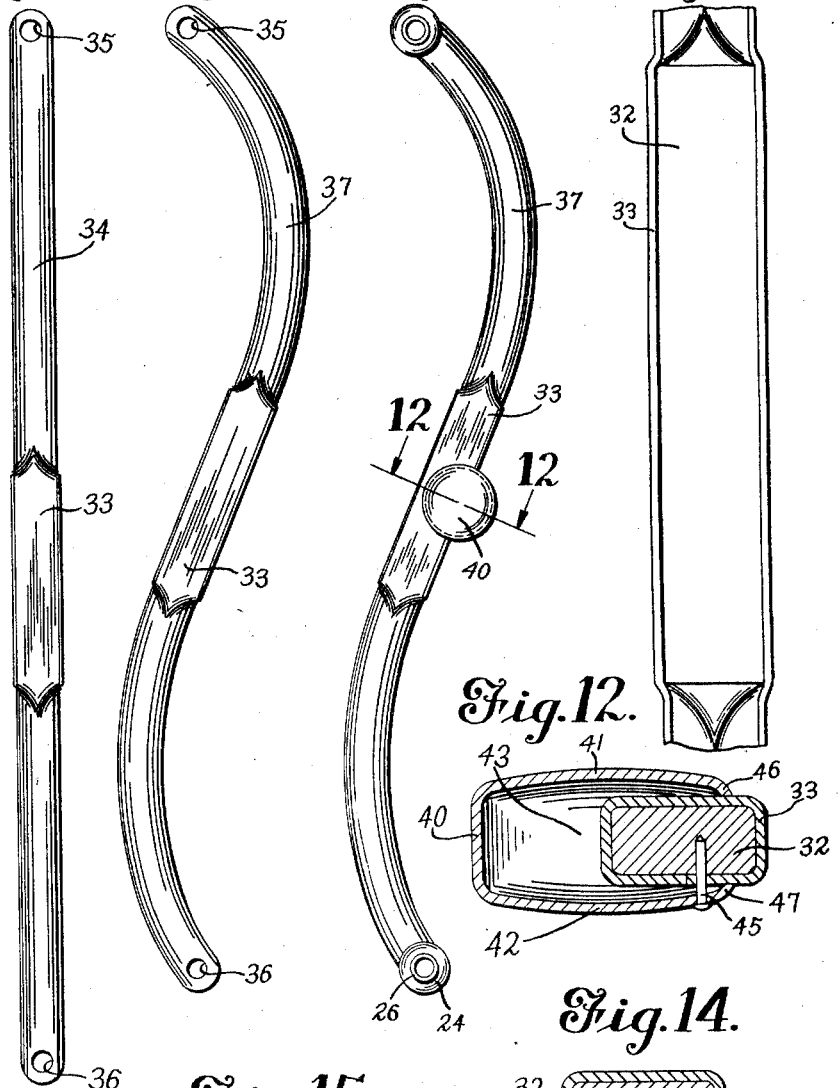

Patented Dec. 27, 1927.

1,654,061

UNITED STATES PATENT OFFICE.

GARDNER E. WHEELER AND CHARLES OPPE, OF NEW HAVEN, CONNECTICUT.

METHOD OF MAKING VEHICLE PROPS.

Original application filed November 4, 1926, Serial No. 146,245, and in Canada March 25, 1927. Divided and this application filed November 1, 1927. Serial No. 230,356.

This invention relates to arms or props for vehicle bodies and more particularly adapted for use upon automobile bodies of closed cars of the sedan or brougham type. Such props are placed toward the rear end of the body and are usually purely ornamental in character. For this purpose they are not supplied with a hinged joint, though in order that they may simulate the usual hinged vehicle prop they are provided with an imitation joint, which also enhances the appearance of the props and renders their use more popular.

It is not required that these devices possess great strength, but, at the same time, they must possess rigidity and durability and must be well made so that the parts will not rattle or become unsightly in use. In the past, such props have usually been made from a solid bar of metal and when made in this way are much heavier than is required, and beside adding useless weight to the vehicle are expensive to construct.

One object of our invention is the provision of a vehicle prop of this character formed from sheet metal.

Another object of our invention is the provision of a vehicle prop which shall be light in weight and relatively inexpensive to manufacture, and at the same time strong and durable.

Another object of our invention is the provision of a novel method of making a vehicle prop of this character from sheet metal or a hollow tubular member so that the resulting article will be strong and the parts thereof firmly bound together, and at the same time will be light in weight and relatively inexpensive.

A still further object of our invention is the provision of a sheet metal vehicle prop of this character which will simulate the usual hinged prop of solid material and which will be very light in weight and quite ornamental in character.

To these and other ends the invention consists in the novel features and combinations of parts to be hereinafter described and claimed.

Fig. 1 is a view of a tubular blank from which the prop is made according to a preferred form of our invention;

Fig. 2 is a view of the blank after being bent into a modified S-shaped form;

Fig. 3 is a view of the completed prop;

Fig. 4 is an enlarged view of the reverse or back side of the central portion of the prop;

Fig. 5 is a sectional view on line 5—5 of Fig. 4;

Fig. 6 is a sectional view on line 6—6 of Fig. 4;

Fig. 6ª is a view similar to Fig. 6, showing a modified form of our invention;

Fig. 7 is a sectional view on line 7—7 of Fig. 3;

Fig. 8 is an elevational view of a prop during the process of construction by another method;

Fig. 9 is a view of the prop shown in Fig. 8 after being bent into a modified S-shaped form;

Fig. 10 is a view of the completed prop shown in Figs. 8 and 9;

Fig. 11 is a view of the central portion of the prop shown in Fig. 8, the view being taken from the reverse side before the edges of the blank are turned over to form the tube;

Fig. 12 is a sectional view on line 12—12 of Fig. 10;

Fig. 13 is a cross-sectional view of the blank from which the prop is made;

Fig. 14 is a transverse central sectional view through the enlarged portion of the prop shown in Fig. 9; and Fig. 15 is a perspective view of the knuckle or imitation hinge member before being applied to the prop.

According to a preferred method of construction illustrated in Figs. 1–7 of the drawings, a straight tubular blank 10 may be provided by any preferred method, such as using an ordinary seamless metal tube of oblong cross-section, as shown at 11 in Fig. 6, or this tube may be made by taking a sheet metal blank, bending the edges thereof to form a channel or U-shaped member, and then turning these edges in to complete the tube. Perforations 12 and 13 are provided adjacent the ends of this blank, and thereafter the tube is bent into a modified S-shaped form (the form desired of the finished prop), as shown at 14 in Fig. 2. The prop will, of course, be hollow but at the same time will be rigid and possess sufficient strength for the use to which such articles are put.

In order to provide an imitation hinge member upon the prop and to ornament it so as to enhance its appearance adjacent the central portion thereof a piece of sheet metal 15 is blanked out, of sufficient width to wrap about the central portion of the prop, the opposite edges substantially meeting along the edges 16. The metal of this blank at its intermediate portion and adjacent one of the edges thereof is drawn up to provide a circular recessed portion or knuckle 17 which simulates the usual hinge. The top of this recessed portion, as shown at 18, will be substantially circular in shape and the periphery thereof where this member projects from the body of the prop is provided with a depending flange 19 so that from the front it will have the appearance of being a solid member of considerable thickness. Adjacent its upper and lower edges on the front side of the prop the sheet metal member 15 may be pointed, as shown at 20 and 21, for purposes of ornamentation.

It will be understood that in many instances, the body of the prop will be covered with paint or enamel to conform to the color of the vehicle body upon which it is used, while the central member 15 may be made of some bright metal, such as aluminium to contrast with the color of the body of the prop and enhance its appearance. The member 15 may be effectually secured in position by being wrapped tightly around the body of the prop and having tongues 22 struck therefrom and turned into openings 23 provided in the wall of the tubular member 10.

Complementary cap members 24 and 25 are provided which, when fitted together, form an end cap which may be slipped over the end of the prop and may be secured thereon by a hollow rivet or eyelet 26 passed through the perforations 12 or 13 and through openings 27 and 28 provided in the cap members. These cap members are provided with end flanges 24$^a$ and 25$^a$ which abut when arranged as shown in Fig. 7 and serve to close the end of the tubular body member and give the article a finished appearance. Means are also provided in this manner to fasten the prop to the body of the vehicle which is ordinarily accomplished by fastening members passing through the openings in the rivets 26.

In Figs. 8 to 15 of the drawings is shown a modified form of our invention wherein the manufacture of the prop is begun with a rectangular piece of sheet metal of the desired length and width which is slightly enlarged at its central portion. The edges of this blank are then turned up into U-shaped form, as shown at 30 in Fig. 13. In order that the finished prop at its central portion may be of enlarged cross-section as compared with the rest of the body and shall be rectangular in cross-section, as shown at 31 in Fig. 14, while the rest of the body is oval, a matrix or form 32 of substantially the same length as the enlarged portion 33 of the finished prop may be placed within the U-shaped blank 30. The upturned edges of the blank are then closed over to meet at substantially the longitudinal center of the prop. The result of the foregoing operations is shown at 34 in Fig. 8 wherein a straight hollow prop is formed of sheet metal having a central enlarged portion 33 within which is the form 32. The ends of the tubular body 34 may be provided with the perforations 35 and 36 either at this time or before the blank is stamped into U-shaped form.

The tube 34 is then bent at its ends into a modified S-shaped form, as shown at 37 in Fig. 9. An imitation hinge or knuckle member 40 is then prepared from sheet metal, preferably aluminium, so that it will be ornamental in character. This member is of substantially cylindrical shape having upper and lower circular bases 41 and 42 joined by the wall 43. This wall is cut away from approximately half of the periphery of the bases 41 and 42 so as to provided an opening or mouth 44 to receive the central enlarged portion 33 of the prop in order that the knuckle member may be slipped upon the prop, the latter being embraced by the bases 41 and 42. The knuckle member may be secured in place by a fastening member such as a rivet or the like 45 which not only passes through the metal wall of the prop but enters the wooden form 32 to hold the knuckle member firmly in place. As shown in Fig. 12 the metal at the periphery of each base 41 and 42 is slightly turned inwardly at 46 and 47 so as to lie closely adjacent the upper and lower surfaces of the prop.

It will, of course, be understood that the seam formed by joining the two edges of the sheet metal blank will be disposed on the back of the finished article so that it will not be visible when the article is in use.

End caps are then applied to the ends of the prop in the manner shown in Fig. 7 and described in connection with the embodiment of our invention shown in Figs. 1 to 7.

In the last described embodiment of our invention the entire prop may be made of some ornamental material such as aluminium, so that the enlarged central portion and knuckle member may be given a bright finish, while the remainder of the article may be painted or enameled to contrast therewith, and conform to the color of the body of the vehicle.

In Fig. 6$^a$ of the drawings we have shown a slightly modified form of our invention. wherein the back of the knuckle member 19$^a$ is closed by a projecting ear or lug 16$^a$ extending from the edge of the member 15$^a$. In this instance, the side flange 20$^a$ of the knuckle member is somewhat deeper than the flange 19 shown in Fig. 6, and the lug or ear 16$^a$ projecting from the outer edge of the member 15ᵃ is bulged or displaced outwardly and serves to close the rear face of the member 19ᵃ so that a knuckle member of substantially the form shown in Fig. 12 is provided. In other respects, this portion of the prop is formed, as shown in Figs. 4, 5 and 6.

It will be obvious that we have provided a method of making a vehicle prop which, while it is possessed of the strength and durability required of such articles, may be much lighter in weight and less expensive to manufacture than similar articles formed of solid metal bars.

We make no claim in this application to the improved vehicle prop as an article of manufacture, as such claims are made in our copending application, Serial No. 146,245, filed November 4, 1926, of which this application is a division.

What we claim is:—

1. The method of making a vehicle prop or the like, which comprises preparing an elongated straight sheet metal blank of tubular formation and of the desired length, providing adjacent the ends of said blank means for attaching it to a vehicle body, reversely bending the ends of the blank into a modified S-shaped formation, forming a knuckle member of circular shape, and securing said knuckle member at the central portion of the S-shaped prop.

2. The method of making a vehicle prop or the like, which comprises preparing a straight elongated tubular blank of the desired length, providing means adjacent the ends of the blank by which it may be secured in place, reversely bending the blank adjacent the end portions thereof into a modified S-shaped form, forming integrally with a separate piece of sheet metal a circular knuckle member, and wrapping said piece of sheet metal about the central portion of the S-shaped prop member with the circular knuckle member projecting laterally therefrom.

3. The method of making a vehicle prop, comprising preparing a straight hollow sheet metal blank of the desired length, reversely bending the blank adjacent its end into modified S-shaped form, providing means upon the ends of the blank by which it may be secured in place, forming a knuckle member of circular shape from sheet metal, and securing this knuckle member to the blank adjacent the central portion thereof, so that it projects laterally therefrom.

4. The method of making a vehicle prop, comprising preparing a tubular blank of the desired length, reversely bending the ends of the tube into modified S-shaped form, forming a circular knuckle member integrally with a piece of sheet metal, securing said sheet metal member to the central portion of the tube with the knuckle member projecting laterally therefrom, then closing the ends of the tube and perfecting openings therethrough to provide means for securing the prop in place.

5. The method of making a vehicle prop, comprising preparing a hollow sheet metal blank of the desired length, and reversely bending the blank adjacent its ends into modified S-shaped form, stamping up a rectangular sheet metal member having a hollow knuckle piece thereon, securing this member adjacent the central portion of the blank with the knuckle piece projecting laterally therefrom by wrapping the edges of the sheet metal member around the blank, and closing the ends of the blank and providing means thereat to secure the prop in place.

6. The method of making a vehicle prop, comprising preparing a tubular blank of the desired length, forming perforations therethrough adjacent its ends, reversely bending the ends of the tube into modified S-shaped form, providing end caps for the tube with laterally projecting flanges, securing the end caps to the tube with the flanges closing the tube ends, and providing perforations in the caps to register with those in the blank, forming a circular knuckle member to simulate a hinge, and securing this knuckle member to the central portion of the blank in a position projecting therefrom.

7. The method of making a vehicle prop, comprising preparing a hollow sheet metal blank of the desired length, and providing perforations therethrough adjacent its ends, reversely bending the blank adjacent its ends into modified S-shaped form, enlarging the ends and the central portion of the blank by securing thereon separate sheet metal members in embracing relation to the blank, providing perforations in the members secured at the ends of the blank to register with the perforations in the blank, and providing upon the separate member at the central portion of the blank a circular knuckle member projecting laterally from the body of the blank to simulate a hinge.

8. The method of making a vehicle prop, comprising preparing a hollow tubular blank of the desired length, having its ends reversely turned into modified S-shaped form, stamping up a sheet metal member having a hollow knuckle-piece thereon, securing this member adjacent the central portion of the blank with the knuckle-piece projecting laterally therefrom by wrapping the sheet metal member around the blank to embrace the same, and providing means at the ends of the blank to secure the prop in place.

9. The method of making a vehicle bow or the like, which comprises preparing a hollow body member of S-shaped formation, providing means at the end of said member by which it may be secured to a vehicle, and providing at the central portion thereof a convex enlarged knuckle member to simulate a hinge.

10. The method of making a vehicle prop comprising preparing a hollow tubular blank of the desired length having its ends reversely turned into modified S-shape form, stamping up a separate sheet metal member having circular depressions in fixed relation to each other, securing this member adjacent to the central portion of the blank by wrapping it around the blank to embrace the same so that the circular depressions register to simulate a knuckle joint projecting laterally from the blank, and providing means at the ends of the blank to secure the prop in place.

In witness whereof, we have hereunto set our hands this 29th day of October, 1927.

GARDNER E. WHEELER.
CHARLES OPPE.